(12) United States Patent
Liu et al.

(10) Patent No.: US 6,225,140 B1
(45) Date of Patent: May 1, 2001

(54) CMOS COMPATABLE SURFACE MACHINED PRESSURE SENSOR AND METHOD OF FABRICATING THE SAME

(75) Inventors: Lianjun Liu; Zhe Wang, both of Singapore (SG)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/170,732

(22) Filed: Oct. 13, 1998

(51) Int. Cl.[7] .................................................. H01L 21/302
(52) U.S. Cl. ................................. 438/48; 438/50; 438/53
(58) Field of Search ................................. 438/48, 50, 53, 438/52; 29/25, 35; 257/419; 73/715, 716, 720, 721, 725, 726, 727, 754, 777; 216/2

(56) References Cited

U.S. PATENT DOCUMENTS

| 4,618,397 | * | 10/1986 | Shimizu et al. | 438/53 |
|---|---|---|---|---|
| 4,766,666 | | 8/1988 | Sugiyama et al. | 29/610 |
| 4,853,348 | | 8/1989 | Tsubouchi et al. | 437/203 |
| 5,165,282 | * | 11/1992 | Nakamura et al. | 73/721 |
| 5,242,863 | | 9/1993 | Xiang-Zheng et al. | 437/228 |
| 5,514,898 | * | 5/1996 | Hartauer | 257/417 |
| 5,531,121 | | 7/1996 | Sparks et al. | 73/716 |
| 5,583,296 | * | 12/1996 | Mokawa et al. | 73/718 |
| 5,672,551 | * | 9/1997 | Fung | 438/53 |
| 5,786,235 | * | 7/1998 | Eisele et al. | 438/53 |
| 5,930,595 | * | 7/1999 | Sridhar et al. | 438/48 |
| 6,046,067 | * | 4/2000 | Werner | 438/53 |
| 6,093,330 | * | 7/2000 | Chong et al. | 216/2 |

* cited by examiner

Primary Examiner—Savitri Mulpuri
(74) Attorney, Agent, or Firm—George O. Saile; Stephen B. Ackerman; Larry J. Prescott

(57) ABSTRACT

A pressure sensor and method of forming the pressure sensor are described. The pressure sensor is formed by etching a number of trenches in a silicon substrate. Dielectric spacers are formed on the sidewalls of the trenches. The bottoms of the trenches are then etched using isotropic etching to undercut the sidewalls of the trenches and form a number of silicon bridges with a limited gap between the underside of the bridges and the bulk silicon substrate. A filler dielectric is then deposited to fill the gaps between the sidewalls of the trenches thereby forming a flexible membrane. Piezoresistors are formed in the silicon bridges or, alternatively, on the flexible membrane. Pressure changes deflect the flexible membrane causing resistance changes in the piezoresistors which can be monitored and related to pressure. The limited gap between the underside of the bridges and the bulk silicon substrate provides overpressure protection for the sensor.

18 Claims, 5 Drawing Sheets

CM OS COMPATABLE SURFACE MACHINED PRESSURE SENSOR AND METHOD OF FABRICATING THE SAME

BACKGROUND OF THE INVENTION (1) Field of the Invention

This invention relates to pressure sensors and more particularly to pressure sensors formed by etching trenches in a substrate, undercutting the sidewalls of the trenches, filling the gaps between the trenches with dielectric, and forming piezoresistors in the region of the trenches and filled gaps.

(2) Description of the Related Art

Pressure sensors are widely used in a number of applications. Pressure sensors have been formed by depositing a layer of polysilicon on a sacrificial layer. Piezoresistors art then formed in the layer of polysilicon layer and the sacrificial layer is etched away leaving the layer of polysilicon as a flexible diaphragm. The resistance of the piezoresistors changes as the diaphragm is deflected by pressure changes. Pressure senors have also been formed by depositing piezoresistors on single crystal silicon and etching away the silicon from the back side of the wafer to form a flexible diaphragm.

U.S. Pat. No. 5,531,121 to Sparks et al. describes a method of forming a pressure sensor by forming an N+ region in the surface of a silicon substrate. A silicon layer, such as epitaxial silicon, is then grown from the surface. One or more trenches are then formed into the N+ region and the N+ region is selectively etched away forming a cavity beneath the surface the surface of the silicon layer. The flexible surface over the cavity is then used to form a pressure sensor.

U.S. Pat. No. 5,242,863 to Xiang-Zheng et al. describes a method of forming a pressure sensor by forming a buried low resistance N type layer under a predetermined diaphragm region of the substrate. One or more trenches which extend to the low resistance N type region are then formed at the edges of the diaphragm region. The low resistance N type material is then converted to porous silicon by anodization of silicon in a concentrated hydrofluoric acid solution. The porous silicon is then etched away leaving the diaphragm region over a cavity. The diaphragm is then flexible and can be used to form a pressure sensor.

U.S. Pat. No. 4,766,666 to Sugiyama et al. describes a method of forming a pressure sensor which uses an insulating diaphragm film formed of an etch resistant material on the surface of a substrate. The diaphragm film has at least one etching hole. A cavity is then etched in the substrate under the diaphragm film using the etching holes in the diaphragm film. The diaphragm film over the cavity then becomes a flexible diaphragm and can be used as a pressure sensor.

U.S. Pat. No. 4,853,348 to Tsubouchi et al. describes the formation of a cavity in a substrate in order to form a capacitor having increased capacitance.

This invention describes a method of forming a flexible diaphragm using different methods which can be used as a pressure sensor. The pressure sensor formed is protected from damage due to overpressure and is formed using processes which are compatible with processing of CMOS or other integrated circuit chips.

SUMMARY OF THE INVENTION

Many applications require pressure sensors to measure gas pressure, liquid pressure, or the touching pressure in specific direction of a solid. It is highly desirable that pressure sensors have low manufacturing cost, good sensitivity, a highly linear response, good stability, and protection from damage due to overpressure. Since these pressure sensors are frequently used in conjunction with semiconductor integrated circuits, particularly CMOS circuits, it is advantageous if the processes for fabricating pressure sensors are compatible with processes used to fabricate CMOS or other semiconductor integrated circuits.

Pressure sensors have been fabricated using piezoelectric resistors formed on a polysilicon thin film deposited on a sacrificial layer. The sacrificial layer is then removed and the polysilicon film becomes a suspended diaphragm which can deform under pressure changing the resistance of the piezoelectric resistor. Pressure sensors have also been fabricated on single crystal silicon substrates. After a piezoelectric resistor has been formed on the substrate surface the backside of the silicon substrate is etched away, using electrochemical etching or other chemical wet etching, leaving the piezoelectric resistor on a thin flexible membrane of silicon. While these methods of forming pressure sensors are compatible with silicon integrated circuit wafer processing they require expensive processing steps, such as etching the back side of the wafer. The pressure sensors fabricated in this manner do not have overpressure protection and can be easily damaged by higher than expected pressure.

It is a primary objective of this invention to provide a method of forming a low cost pressure sensor having good overpressure protection using methods which are compatible with integrated circuit processing.

It is another primary objective of this invention to provide a low cost pressure sensor having good overpressure protection which can be located on the same substrate as integrated circuits.

These objectives are achieved by forming a layer of first dielectric having a number of openings on a substrate, such as a silicon integrated circuit substrate. A number of trenches are then formed in the substrate using the dielectric layer with openings as a mask. Second dielectric spacers are then formed on the sidewalls of the trenches. Isotropic etching is then used to etch the bottom of the trenches thereby undercutting the sidewalls of the trenches and releasing them from the bulk substrate. A third dielectric is then deposited filling the gaps between the sidewalls of the trenches thereby forming a flexible membrane. Piezoresistors are formed on or in the flexible membrane to measure the deflection of the membrane due to pressure on the membrane. The piezoresistors can be implanted or diffused resistors formed in the silicon substrate prior to forming the layer of first dielectric. Alternatively piezoelectric material can be deposited on the flexible membrane and patterned after the deposition of the third dielectric. The distance between the flexible membrane and the bulk substrate can be carefully controlled and provides overpressure protection. The methods used to form the pressure sensor are low cost and compatible with semiconductor integrated circuit processing. The pressure sensor and method of forming the pressure sensor will now be described in detail with reference to the following drawings.

BRIEF DESCRIPTION OF THE DRAWINGS

FIG. 3 is a cross section view of the substrate shown in FIG. 4A along line 3–3' in FIG. 4A.

DESCRIPTION OF THE PREFERRED EMBODIMENTS

Figure 1:
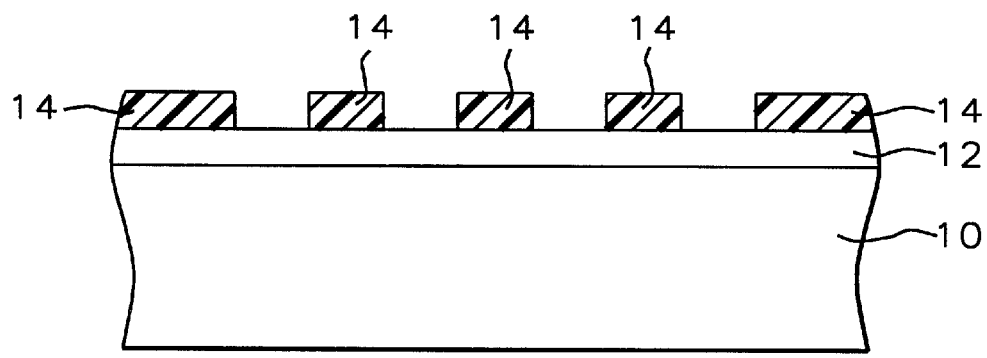
FIG. 1 shows a cross section view of a substrate having a layer of first dielectric formed thereon and a patterned layer photoresist formed on the layer of first dielectric.

FIG. 1 shows a cross section view of a silicon substrate 10 having a sensor region with a layer of first dielectric 12 formed thereon. The layer of first dielectric will serve as a mask layer in forming trenches in the substrate and is a material such as silicon oxide, $SiO_x$, or the like. Piezoelectric resistors are used as sensors in the sensor region. Resistors formed in the silicon substrate 10 prior to the deposition of the layer of first dielectric 12 using diffusion or ion implantation can be used as the piezoelectric resistors. The substrate may also have other devices formed therein, which are not shown. A layer of photoresist 14 is formed on the layer of first dielectric and patterned using standard photoprocessing techniques. The pattern in the photoresist 14 defines a number of openings which are over the sensor region of the substrate and at the locations where the trenches will be formed in the substrate.

Figure 2:
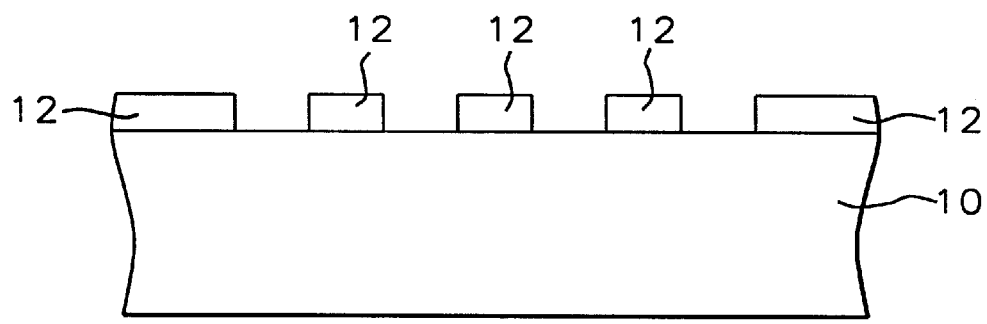
FIG. 2 shows a cross section view of a substrate after openings have been formed in the layer of first dielectric.
Figure 3:
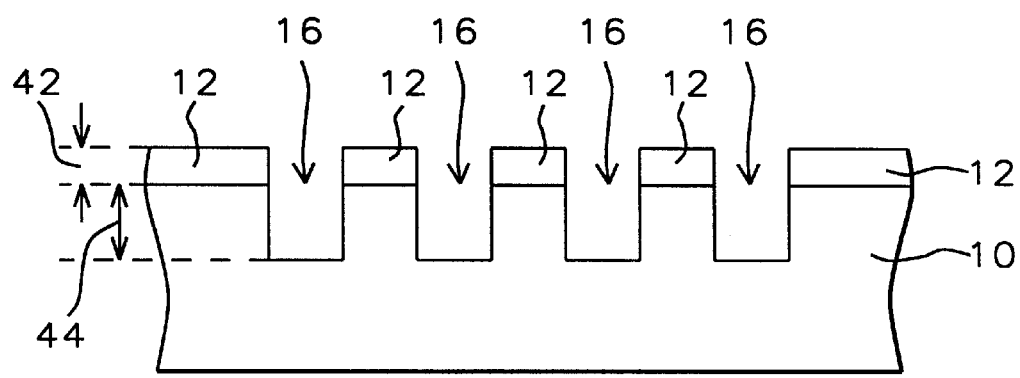
FIG. 3 shows a cross section view of a substrate after trenches have been formed in the substrate.

As shown in FIG. 2 the openings are etched in the layer of first dielectric 12 using the patterned layer of photoresist as a mask and either wet or dry etching methods. The photoresist is then removed. As shown in FIG. 3 trenches 16 are then formed in the substrate 10 using the patterned layer of first dielectric material 12 as a mask and dry anisotropic etching using an etchant such as $SF_6$ or $Cl_2$. The trenches 16 are etched to a depth 44 of between about 1.5 and 15 micrometers. The thickness of the first dielectric layer 42 is between about 1000 and 30,000 Angstroms.

Figure 4A:
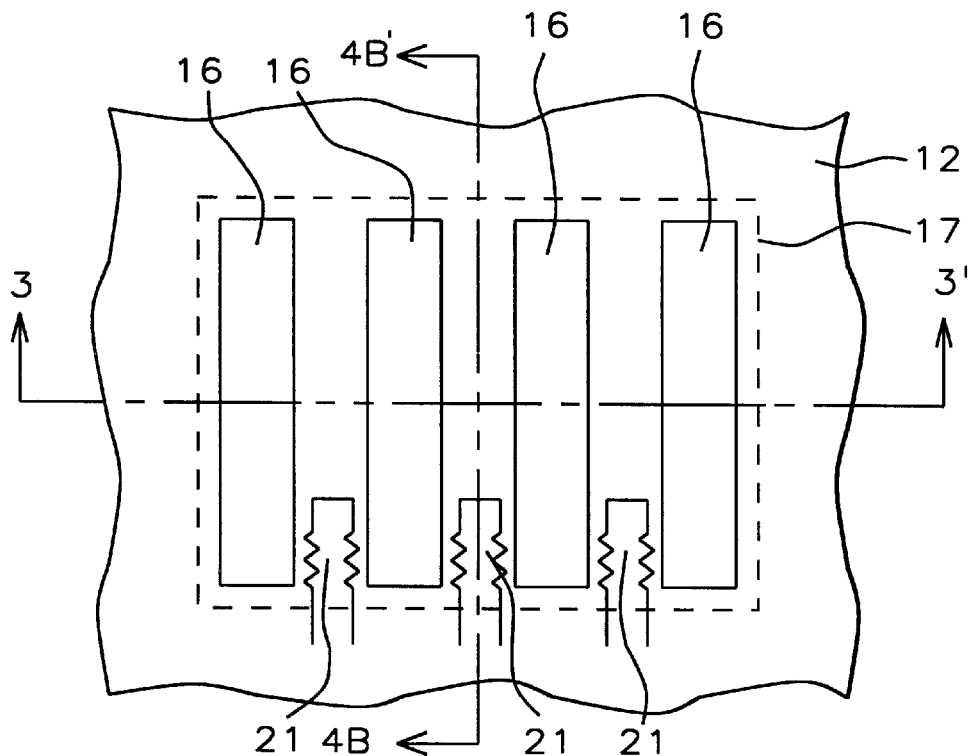
FIG. 4A shows a top view of a substrate after openings have been formed in the layer of first dielectric and trenches have been formed in the substrate.
Figure 4B:
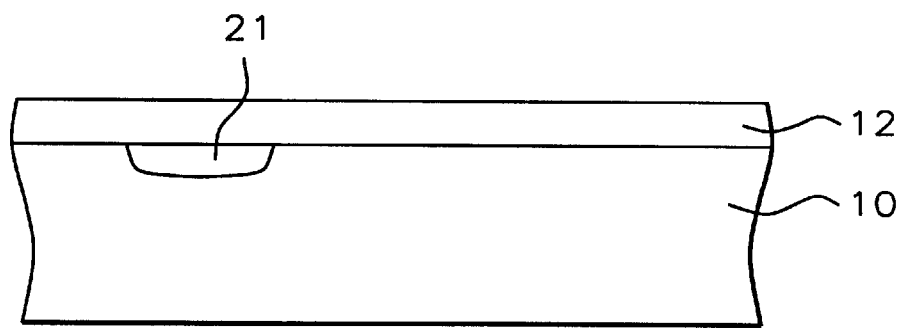
FIG. 4B shows a cross section view of the substrate of FIG. 4A, along line 4B–4B' of FIG. 4A, showing the location of diffused or implanted resistors.

FIG. 4A shows a top view of the sensor region of the substrate at this stage of fabrication. The perimeter of the sensor region is indicated by a dashed line, reference number 17. Possible locations of the diffused or implanted resistors 21 are shown by a resistor schematic in FIG. 4A. FIG. 4B shows a cross section of the substrate along line 4B–4B' of FIG. 4A showing the diffusion or implant profile of one of the resistors 21. The resistors are located near the edge of the sensor region, as will be explained layer, and other locations than those shown can be used. FIG. 3 is a cross section of the substrate taken along line 3–3' of FIG. 4A. The trenches 16 are located in the sensor region of the substrate and in this example are all parallel to each other.

Figure 5:
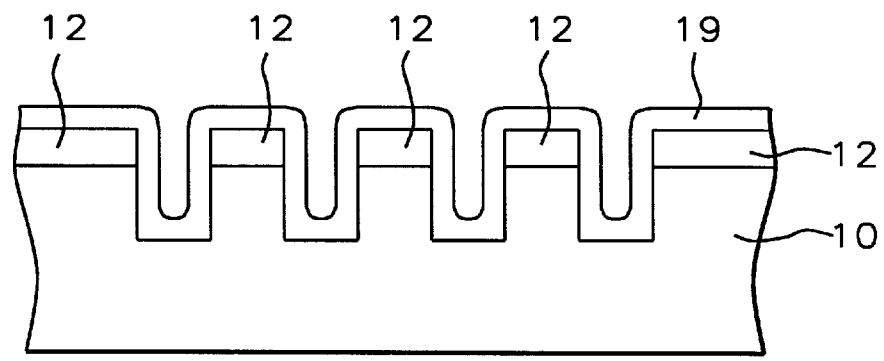
FIG. 5 shows a cross section view of a substrate after a conformal layer of second dielectric has been deposited.
Figure 6:
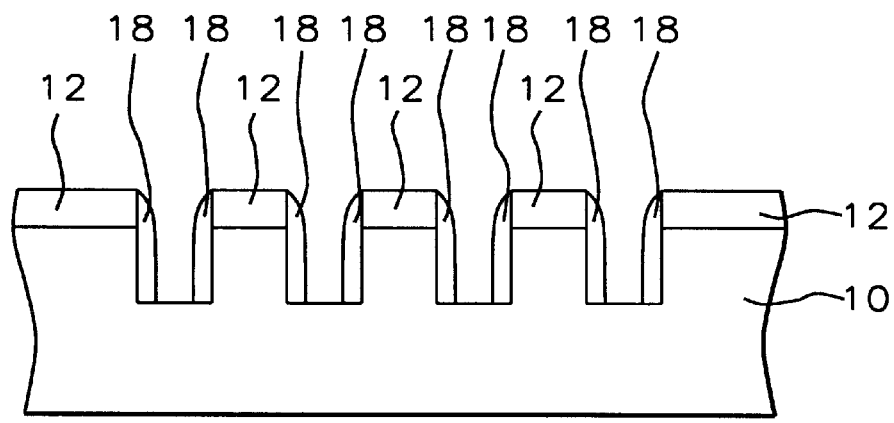
FIG. 6 shows a cross section view of a substrate after the conformal layer of second dielectric has been etched back to form spacers on the sidewalls of the trenches.

Next, as shown in FIG. 5, a conformal layer of second dielectric 19 is formed on the substrate covering the sidewalls and bottoms of the trenches. In this example the conformal layer of second dielectric is silicon oxide, $SiO_x$, deposited using chemical vapor deposition and having a thickness of between about 2000 and 10,000 Angstroms. The conformal layer of second dielectric 18 is then etched back using dry anisotropic etching and an etchant such as $CF_4$ leaving second dielectric spacers 18 on the sidewalls of the trenches but removing second dielectric material from the bottom of the trenches, see FIG. 6.

Figure 7:
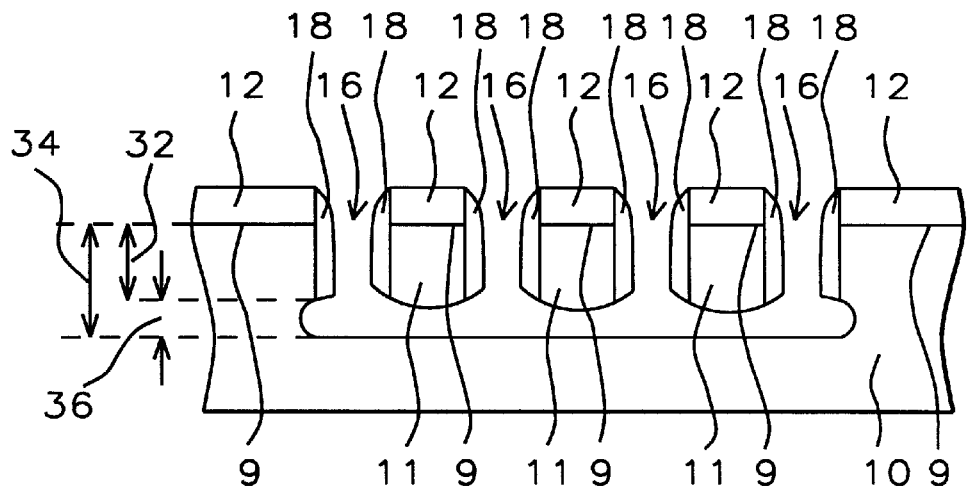
FIG. 7 shows a cross section view of a substrate after the bottom of the trenches has been isotropically etched releasing the trench sidewalls from the bulk substrate.

Next, as shown in FIG. 7, the bottom of the trenches are etched using wet isotropic etching with an etchant such as tetramethylammonium hydroxide, TMAH, or dry isotropic etching using $SF_6$ as an etchant. The isotropic etching undercuts the sidewalls of the trenches and all of the substrate material greater than a first distance 32 from the first surface 9 of the substrate, less than a second distance 34 from the first surface 9 of the substrate, and in the sensor region of the substrate is etched away. The isotropic etching forms a number of silicon bridges 11. There is a gap 36 of between about 2 and 70 micrometers between the silicon bridges 11 and the bulk substrate.

Figure 8:
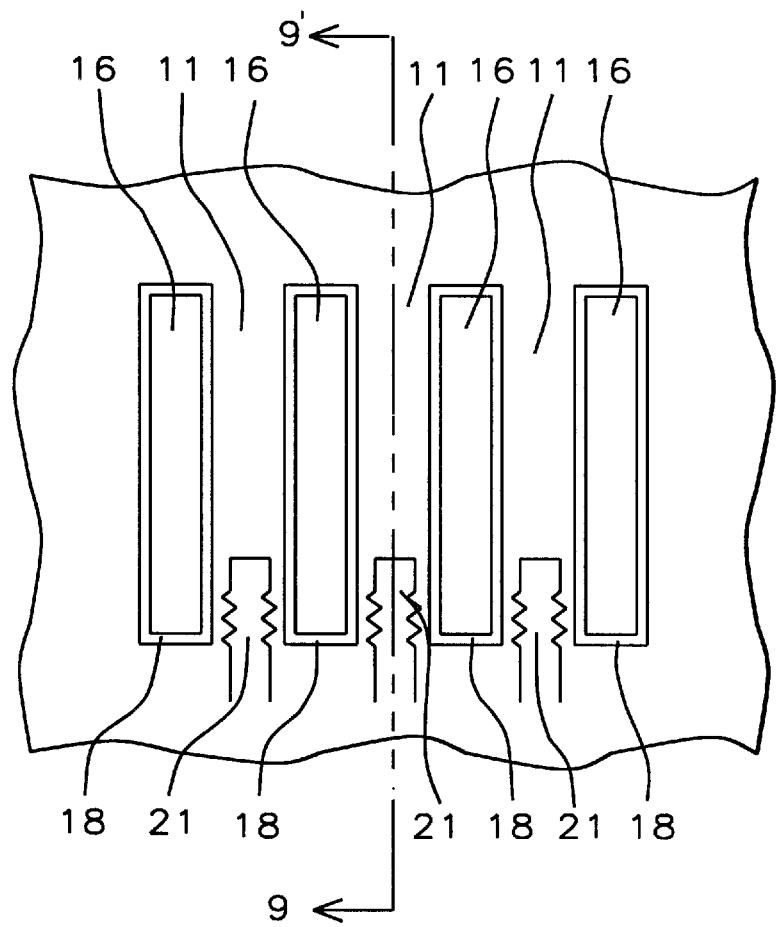
FIG. 8 shows a top view of a substrate after the bottom of the trenches has been isotropically etched releasing the trench sidewalls from the bulk substrate showing the location of piezoresistors formed in the silicon substrate.
Figure 9:
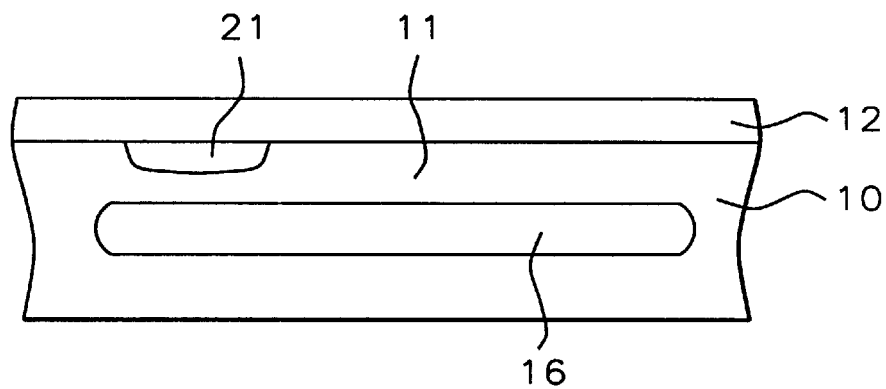
FIG. 9 shows a cross section view of the substrate of FIG. 8, along line 9–9' of FIG. 8, showing resistors formed in the silicon substrate.

FIG. 8 shows a top view of the substrate after the silicon bridges 11 have been formed showing that the diffused or implanted resistors 21 are located in the silicon bridges 11 and near the edge of the sensor region. FIG. 9 shows a cross section, taken along line 9–9' of FIG. 8, of the substrate 10 after the silicon bridges 11 have been formed showing the diffused or implanted resistors located in the silicon bridges near the edge of the sensor region.

Figure 10:
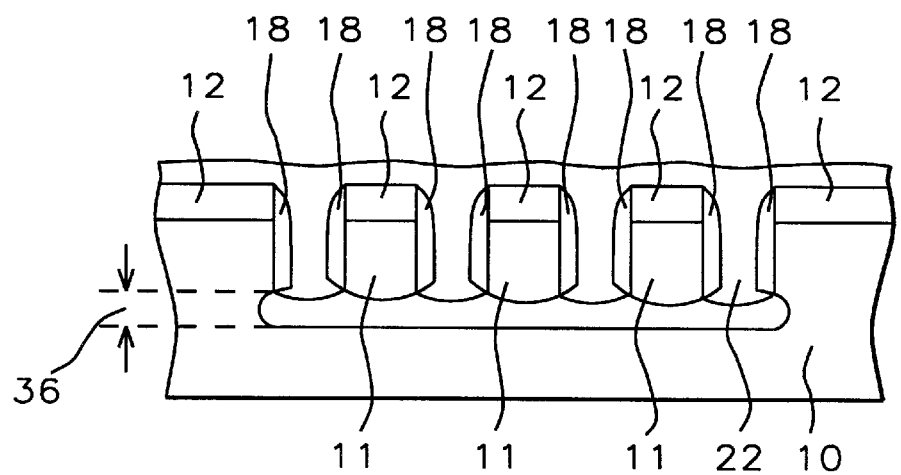
FIG. 10 shows a cross section view of a substrate after the spaces between the sidewalls of the trenches has been filled with a third dielectric, thereby forming a flexible membrane.

Next, as shown in FIG. 10, a third dielectric 22 such as silicon oxide, $SiO_x$, is deposited on the substrate, using means such as chemical vapor deposition, and fills the gaps between the sidewalls of the trenches. The silicon bridges 11 and the third dielectric 22 filling the gaps between the sidewalls of the trenches form a flexible membrane which will be deflected when subjected to pressure. The deflection of the flexible membrane is limited by the gap 36 between the silicon bridges and the bulk of the substrate and this limit provides overpressure protection for the sensor.

As shown in FIGS. 8 and 9 the diffused or implanted resistors 21 are located at the edge of the sensor region. Deflection of the flexible membrane will cause distortion of the resistors 21 which will cause resistance changes. These resistance changes can be used to detect pressure. The location of the resistors 21 at the edge of the sensor region causes maximum distortion of the resistors 21, thereby providing maximum resistance change and maximum sensitivity for pressure detection. Changes in pressure cause a deflection of the flexible membrane which changes the resistance of the piezoresistors 21. The resistance of the piezoresistors can be measured directly or can be connected in an arrangement such as a wheatstone bridge to provide a voltage output as an indicator of pressure. The deflection of the membrane is limited by the gap 36 between the silicon bridges and the bulk substrate and prevents permanent damage to the pressure sensor in an overpressure situation.

Figure 11:
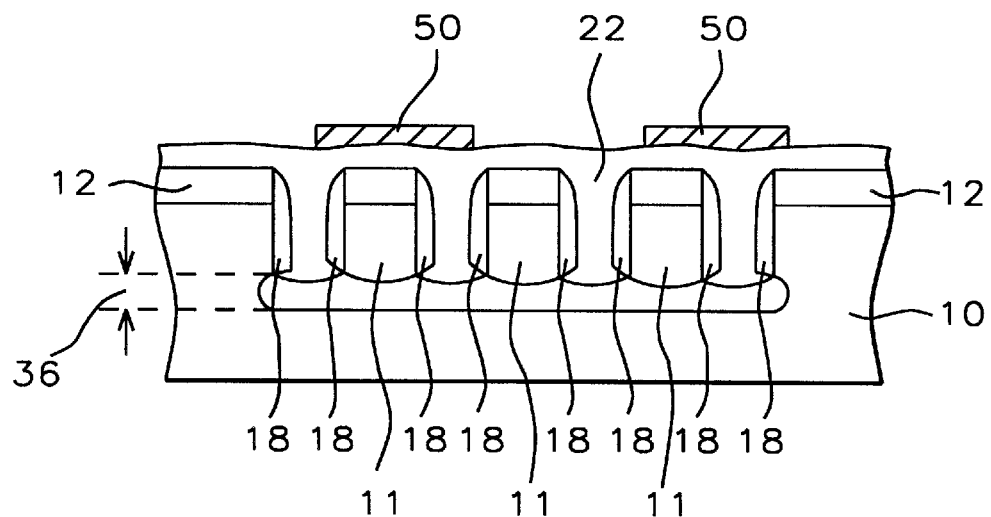
FIG. 11 shows a cross section view of a substrate after piezoelectric material has been formed on the third dielectric and patterned forming piezoelectric resistors on the flexible membrane.

An alternative embodiment of piezoresistor sensor formation is shown in FIG. 11. In this embodiment the diffused or implanted resistors are not formed. After the third dielectric has been formed, completing the formation of the flexible membrane, piezoelectric material can be deposited and patterned forming piezoelectric resistors 50 on the top of the flexible membrane, as shown in FIG. 11. As in the case of diffused or implanted resistors, changes in pressure cause a deflection of the flexible membrane which changes the resistance of the piezoresistors 50. As in the case of diffused or implanted resistors these resistors are also located at the edge of the sensor region.

The processes used to fabricate the pressure sensor are compatible with processes for forming integrated circuit chips so that the pressure sensor can be incorporated in a substrate with other devices or circuits.

While the invention has been particularly shown and described with reference to the preferred embodiments thereof, it will be understood by those skilled in the art that various changes in form and details may be made without departing from the spirit and scope of the invention.

What is claimed is:

1. A method of forming a pressure sensor, comprising the steps of:

providing a silicon substrate having a sensor region and a first surface;

forming a number of piezoresistor sensors in said sensor region of said silicon substrate;

forming a layer of first dielectric on said first surface of said silicon substrate;

patterning said layer of first dielectric thereby forming a number of openings in said layer of first dielectric wherein said openings are over said sensor region of said silicon substrate;

etching a number of trenches in said sensor region of said silicon substrate using said patterned layer of first dielectric as a mask wherein each of said trenches are over said sensor region of said silicon substrate and have sidewalls, a bottom, and a depth;

forming a layer of second dielectric on said silicon substrate thereby forming a conformal coating of second dielectric on said patterned layer of first dielectric, said sidewalls of each of said trenches, and said bottom of each of said trenches;

etching back said layer of second dielectric thereby forming second dielectric spacers on said sidewalls of each of said trenches and removing said second dielectric from said bottom of each of said trenches;

isotropically etching said bottoms of each of said trenches using said patterned layer of first dielectric and said second dielectric spacers as a mask thereby removing that part of said silicon substrate greater than a first distance from said first surface of said silicon substrate, less than a second distance from said first surface of said silicon substrate, and within said sensor region of said silicon substrate, wherein said second distance is greater than said first distance and said first distance subtracted from said second distance is between about 2 and 20 micrometers; and filling the spaces between said sidewalls of said trenches with a third dielectric material thereby forming a flexible membrane within said sensor region of said silicon substrate.

2. The method of claim 1 wherein said piezoresistor sensors are doped silicon resistors formed in said silicon substrate by means of diffusion.

3. The method of claim 1 wherein said piezoresistor sensors are doped silicon resistors formed in said silicon substrate by means of ion implantation.

4. The method of claim 1 wherein said silicon substrate has devices formed therein.

5. The method of claim 1 wherein said first dielectric is $SiO_x$.

6. The method of claim 1 wherein said depth of each of said trenches is between about 1.5 and 15 micrometers.

7. The method of claim 1 wherein said second dielectric is $SiO_x$.

8. The method of claim 1 wherein said third dielectric material is $SiO_x$ formed using chemical vapor deposition.

9. The method of claim 1 wherein said piezoresistor sensors comprise patterned piezoresistor material formed on said flexible membrane.

10. The method of claim 1 wherein deflection of said flexible membrane causes resistance changes in said piezoresistor sensors.

11. A method of forming a pressure sensor, comprising the steps of:

providing a silicon substrate having a sensor region and a first surface;

forming a layer of first dielectric on said first surface of said silicon substrate;

patterning said layer of first dielectric thereby forming a number of openings in said layer of first dielectric wherein said openings are over said sensor region of said silicon substrate;

etching a number of trenches in said sensor region of said silicon substrate using said patterned layer of first dielectric as a mask wherein each of said trenches are over said sensor region of said silicon substrate and have sidewalls, a bottom, and a depth;

forming a layer of second dielectric on said silicon substrate thereby forming a conformal coating of second dielectric on said patterned layer of first dielectric, said sidewalls of each of said trenches, and said bottom of each of said trenches;

etching back said layer of second dielectric thereby forming second dielectric spacers on said sidewalls of each of said trenches and removing said second dielectric from said bottom of each of said trenches;

isotropically etching said bottoms of each of said trenches using said patterned layer of first dielectric and said second dielectric spacers as a mask thereby removing that part of said silicon substrate greater than a first distance from said first surface of said silicon substrate, less than a second distance from said first surface of said silicon substrate, and within said sensor region of said silicon substrate, wherein said second distance is greater than said first distance;

filling the spaces between said sidewalls of said trenches with a third dielectric material thereby forming a flexible membrane within said sensor region of said silicon substrate; and forming a number of piezoresistor sensors on said flexible membrane, wherein said piezoresistor sensors comprise patterned piezoresistor material.

12. The method of claim 11 wherein said silicon substrate has devices formed therein.

13. The method of claim 11 wherein said first dielectric is $SiO_x$.

14. The method of claim 11 wherein said depth of each of said trenches is between about 1.5 and 15 micrometers.

15. The method of claim 11 wherein said second dielectric is $SiO_x$.

16. The method of claim 11 wherein said third dielectric material is $SiO_x$ formed using chemical vapor deposition.

17. The method of claim 11 wherein said first distance subtracted from said second distance is between about 2 and 20 micrometers.

18. The method of claim 11 wherein deflection of said flexible membrane causes resistance changes in said piezoresistor sensors.

* * * * *